United States Patent [19]

Revol et al.

[11] Patent Number: 4,884,931
[45] Date of Patent: Dec. 5, 1989

[54] SUSPENSION PEG

[75] Inventors: Gérard Revol; Maxime Roillet, both of Chabeuil; Jean-Paul Barthomeuf, Bourg de Peage, all of France

[73] Assignee: Societe de Prospection et d'Invention Techniques, S. A., Bourg les Valence, France

[21] Appl. No.: 160,544

[22] Filed: Feb. 25, 1988

[30] Foreign Application Priority Data

Feb. 25, 1987 [FR] France ................................ 8702484
Nov. 10, 1987 [FR] France ................................ 8715537

[51] Int. Cl.⁴ ............................................ F16B 13/06
[52] U.S. Cl. ........................................ 411/57; 411/61; 411/70; 411/71; 248/231.91
[58] Field of Search ................... 411/54, 55, 57, 60, 411/61, 70, 44, 71; 52/698; 248/231.91; 405/259

[56] References Cited

U.S. PATENT DOCUMENTS

| 450,127 | 4/1891 | Wrigley | 52/698 X |
| 2,373,983 | 4/1945 | Strid | 411/61 |
| 2,878,668 | 3/1959 | Starling et al. | 411/75 X |
| 3,709,089 | 1/1973 | Seetaram | 411/61 |
| 4,195,952 | 4/1980 | Swanson | 411/61 X |
| 4,634,326 | 1/1987 | Fischer | 411/61 X |
| 4,669,935 | 6/1987 | Herb | 411/61 X |
| 4,688,977 | 8/1987 | Seetaram | 411/61 X |
| 4,730,966 | 3/1988 | Schiefer | 405/259 X |

FOREIGN PATENT DOCUMENTS

| 7903235 | 9/1979 | France . | |
| 690622 | 4/1953 | United Kingdom | 411/70 |

Primary Examiner—Gary L. Smith
Assistant Examiner—Douglas E. Ringel
Attorney, Agent, or Firm—Schwartz & Weinrieb

[57] ABSTRACT

A suspension peg is provied in which the wire, obtained by die stamping a metal strip and bonding the same, forms a securing eye and has at its end, to be introduced into an anchorage hole, a cylindrical portion formed by two shells and a truncated expansion cone adapted for cooperating with an expandable anchorage socket under the action of a retractive force exerted upon the eye.

20 Claims, 4 Drawing Sheets

4,884,931

SUSPENSION PEG

BACKGROUND OF THE INVENTION

1. Field of the Invention

The present invention relates to a suspension peg comprising a wire bent upon itself so as to form cooperating half-sections and forming a securing eye, one of the ends of the wire, intended to be introduced into an anchorage hole being adapted so as to cooperate, under the action of an outward tractive force exerted upon the eye, with anchorage means for anchoring the peg within the hole of the wall.

Suspension pegs are used mainly for securing false ceilings, their securing eyes providing a connection with a bar, a wire, a rail or any other similar suspension means.

Most of the suspension pegs normally used are expensive to manufacture, because of the pressing, boring, turning or heat treatment operations which they must undergo depending upon the particular case.

2. Description of the prior art

From U.S. Pat. No. 2,878,668 a peg is known of the above mentioned type in which the anchorage end of the wire, the other end not playing any role, is curved back upon itself in the form of a setting rod so as to drive a key against an anchorage wedge, so as to thus be able to obtain a wedge effect end provide anchorage of the key and of the wedge and peg within the hole.

However, particularly because one of the ends of the wire plays no role in the anchorage assembly, the withdrawal resistance of this prior art peg is too weak.

OBJECT OF THE INVENTION

The invention of the present application aims at overcoming the aforenoted disadvantage of the prior art suspension pegs.

SUMMARY OF THE INVENTION

Consequently, the present invention relates to a peg of the above defined type, characterized by the fact that both ends of the wire are intended to be introduced into the anchorage hole and they are adaapted so as to cooperate with each other and with the anchorage means, under the action of a retractive force, for anchoring the peg within the hole.

With the invention, the withdrawal resistance of the peg is good since both ends of the wire participate with respect thereto.

In the preferred embodiment of the peg of the invention, the ends of the bent wire form a truncated expansion cone adapted for cooperaating with an expandable anchorage socket.

In another embodiment of the peg of the invention, the ends of the wire each comprise aan expansion ramp and they are bent over an expansion wedge so that, during the retractive force exerted upon the eye, they are anchored within the sidewall of the hole.

Whereas in the proceding embodiment of the peg of the inventio it is the socket which is anchored within the sidewall the hole, in this embodiment it is the ends of the wire which are anchored within the hole.

The peg of the invention may include a semicylindrical wire with a flat face, bent or folded over in half upon itself, along its flat face.

The peg of the invention may also include a wire obtained by die stamping a metal strip, such being very economical from a manufacturing standpoint. In this case, the ends of the wire bent in half upon itself may form a body with two cylindrical shells including a closure disk formed by means of a bent extensionof one of the shells and bearing upon the other one, for making the body relatively non-deformable.

BRIEF DESCRIPTION OF THE DRAWINGS

The invention will be better understood from the following description of several embodiments of the peg of the invention with reference to the accompanying drawings in which.

DESCRIPTION OF THE ILLUSTRATED EMBODIMENTS

Figure 1:
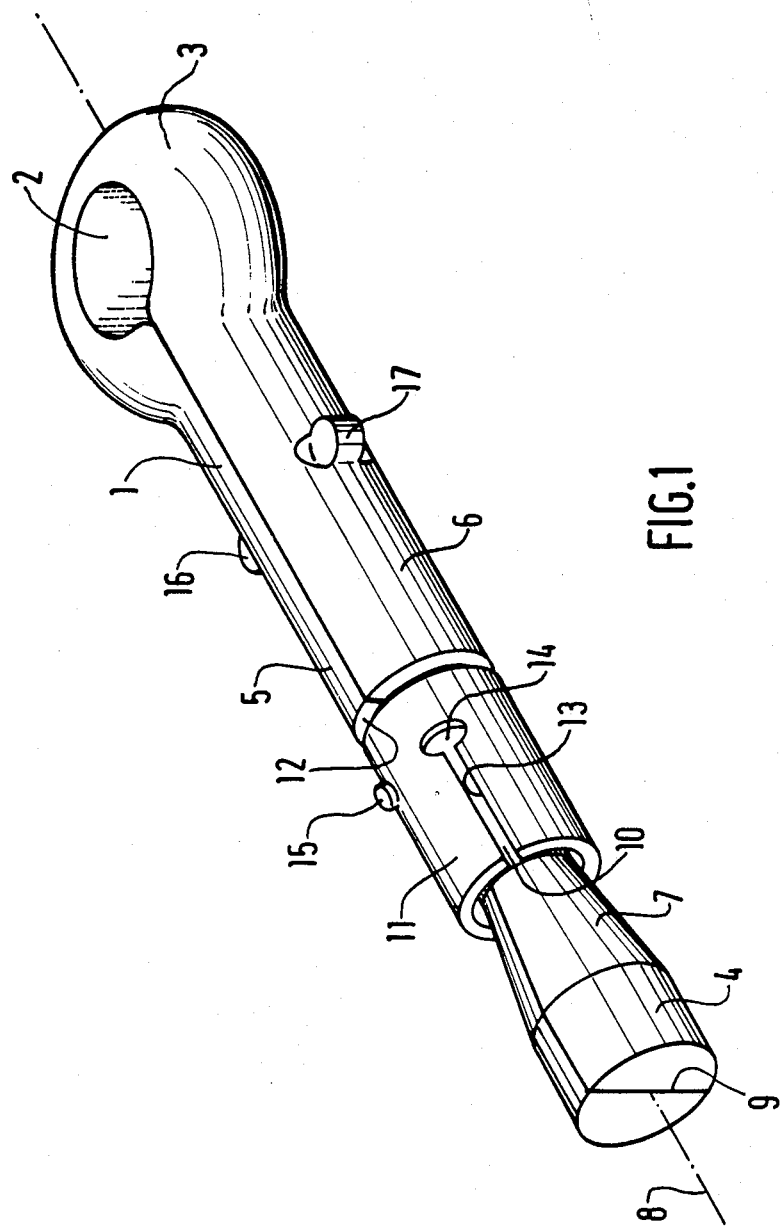
FIG. 1 is a perspective view of a first embodiment of the peg of the invention.

The peg shown in FIG. 1, which is a suspension peg to be used in connection with false ceilings, has been formed from a semicylindrical solid wire 1 with a flat face 2, that is, a wire having a semicircular cross section. It should be stated, however, that the wire of the peg of the invention could have a semi-elliptical or rectangular section.

Wire 1 has been bent or folder in half upon itself, along its flat face 2 so as to form a sescuring eye 3 at one end of the suspension seg, thus formed and, at the other endd, a cylindrical portion 4 of circular section formed by the juxtaposition, through their diameters, of two semicylindrical sections of the starting wire, and with an axis 8 extending in the plane of the joint 9 of the two legs 5, 6, these two sections acting one upon the other so as to form a relatively non-deformable body during tensioning of the peg, which will be described hereinbelow. To accentuate this effect, score portions may be formed upon the faces of the wire sections which cooperate together.

The two side by side legs 5, 6 have been shaped, before or after performance of a bending operation, over a portion adjacent the cylindrical end portion 4 so as to form a truncated cone shaped portion 7 coaxia with axis 8. Beyond this truncated cone portion 7, on the other side thereof with respect to the cylindrical end portion 4, the two legs 5, 6 have been shaped so as to form another cylindrical portion 10 having a reduced diameter portion with respect to cylindrical portion 4 and an annular shoulder 12.

Upon the reduced diameter cylindrical portion 10 there is mounted a cylindrical radially expandable anchorage socket 11, coaxial with axis 8, having an internal diameter slightly greater than the diameter of the reduced portion 10 and having an external diameter substantially equal to the diameter of the circular section defined by means of the two side by side legs 5, 6. At the initial position, socket 11 is disposed substanially between the truncated cone portion 7 and the annular shoulder 12. it participates in holding the legs in their side by side position. Socket 11 has been obtained from a rectangular plate, rolled upon itself, with its two opposite edges joined side by side, not visible in the Figure. An additional expansion slit 13 has been formed therein, parallel to axis 8, with an end opening 14 for facilitating the expansion. Socket 11 also comprises a plurality of immobilization studs 15 only one of which is shown in the drawing.

Legs 5, 6 have positioning studs 16, 17, disposed diametrically opposite with respect to each other within a plane disposed perpendicular to axis 8.

The peg has been described hereinabove as being formed from a wire with a flat face; however, this is not a limitative characteristic of the invention, although it is advantageous. In fact, instead of bending or folding back two flat faces one upon the other, two complementary faces, for example one convex and the other concave, could be bent or folded back upon each other, but at a price of pointless complication in shaping.

The peg could also be formed of a so called half elliptical wire which, by bending or folding the same back upon itself, leads to an elliptical section and nota circular one, or alternatively, the peg could also be formed from a wire having square or rectangular section, resulting in a rectangular section.

The operaation for anchoring the peg of FIG. 1 will now be described.

Having previously bored a hole within the receiving material of a diameter slightly greater than the external diameter of the socket 11 but slightly less than the overall distance between the two positioning studs 16, 17, the peg is inserted into the hole by means of its cylindrical end portion 4, using a tool such as, for exaple, a hammer until the positioning studs 16, 17, abut against the edge of the hole. The positioning studs 16, 17 thus define the penetration depth of socket 11. Then, using the same tool but this time as a lever, a retractive force is exerted externally of the hole upon the peg by means of its eye 3. With the socket immobilized with respect to translational movement thereof by means of its studs 15 when the retractive force is impressed upon the peg, he expansion cone 7 penetraates the socket 11 so as to radially expand the same until it is anchored within the sidewall defining the receiving hole. The peg is then itself anchored within the hole.

A single tool is sufficient for inserting the peg and anchoring it.

Figure 5:
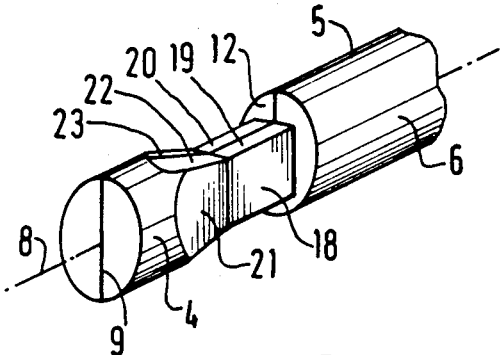
FIG. 5 is a perspective view of an end portion of a third embodiment of the peg of the invention.

FIG. 5 shows a variant of the peg of FIG. 1, in which the reduced diameter portion 10 and truncated cone 7 surfaces of FIG. 1 are replaced respectively by means of flat surfaces 18, 19, 20 and 21, 22, 23 so as to give the peg square sections, the surfaces 21, 22, 23, the closest to the end portion 4, forming a frustum of a pyramid. The side of the square 18, 19 and 20 with respect to the remaining portions of legs 5 and 6 is such that it forms shoulder 12 and allows for the assembly of socket 11, as in the embodiment shown in FIG. 1.

It will be noted that, instead of an expandable socket, it is possible in one embodiment of the peg of the invention, closely related to those which have just been described, to use two lateral weddges shaped so s to cooperates with two opposite expansion ramps formed upon the two ends of the bent wire, respectively.

Figure 2:
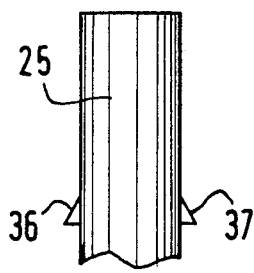
FIG. 2 is a front view of an end portion of a second embodiment of the peg of the invention.
Figure 3:
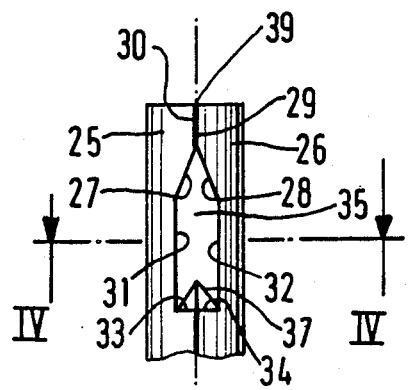
FIG. 3 is a side view of the peg portion of FIG. 2.
Figure 4:
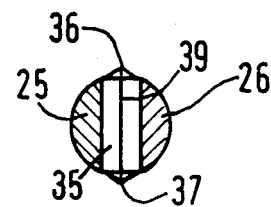
FIG. 4 is a cross sectional view of the peg portion of FIG. 3 taken along line IV—IV.

The embodiment of the peg shown in FIGS. 2 to 4 is identical with that shown in FIG. 1, except for its end and its anchorage means.

The two ends of the starting wire, before bending the legs 25, 26 thereof one upon the other, are shaped so as to provide respectively, from the two flat end starting surfaces 29, 30, two ramps 27, 28 inclined in opposite directions with respect to each other and two adjacent lands 31, 32 forming two shoulders 33, 34. After the bending or folding operation, the end portions of the legs 25, 26 of the peg are bent back upon a wedge member 35. Having a general rectangular shape upon one side, weddge 35 has upon the other side, perpendicular to the first side, a section corresponding to the recess of the legs, with a rectangular portion defined at the rear, against the shoulders 33, 34, and of a width equal to the distance separating the two lands 31, 32 and a triangular portion defined at the front, between ramps 27, 28 with the same being disposed within a plane of symmetry with respect to he joint plane 30 of the legs 25, 26 of the peg. Wedge 35 has two immobilizing studs 36, 37 which project outwardly from the legs of the peg through openings formed by the ramps and the adjacent lands.

It will be noted that in an embodiment very similar to that which has just been described the wedge could be of a general conical shape and the ramps and lands of the legs replaced by corresponding conical surfaces.

In order to anchor the peg shown in FIGS. 2–4, the procedure is the same as that for FIG. 1, but in this case, it is the endds of legs 25, 26 which, as a result of their translational movement and by engagement with wedge 35 secured against translation by means of studs 36, 37, move away from each other so as to anchor themselves within the sidewall of the anchorage hole.

The peg shown in FIGS. 6 to 9 has been formed from a metal strip 41, that is to say a long and thin strip of metal sheet with two axes of symmetry, one longitudinal axis 42 and the other perpendicular to the first one.

Figure 6:
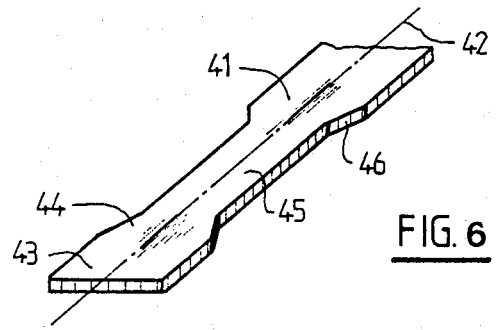
FIG. 6 is a perspective view of one of the ends of the starting metal strip of a fourth embodiment of the peg of the invention, subsequent to a cutting operation.
Figure 7:
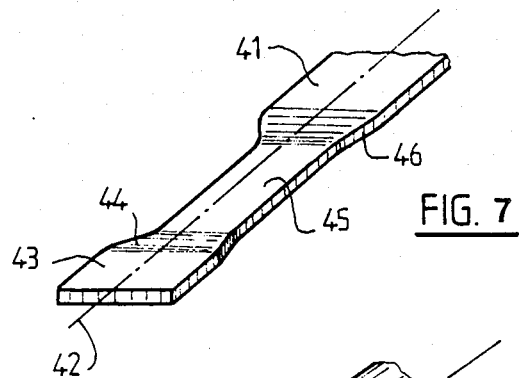
FIG. 7 is a perspective view of the end of the metal strip of FIG. 6, after a bending operation has been performed thereon.

Starting the with the metal strip considered, each of its longitudinal side edge portions is shaped by cutting out, laterally upon both sides of axis 42, a small trapezoidal portion so as to form, from the end towards the middle portion of the strip, a rectangular portion 43 of the same width as the initial metal strip, a trapezoidal portion 44, integrally attached to the portion 43 by means of its large base of the same width, and a rectangular portion 45, narrower and longer than portion 43, integrally aattached to the trapezoidal portion 44 by means of its small base and connected to a middle portion 41 by means of two shoulders 46 which are inclined with respect to axis 42 (FIG. 6). Within the vicinity of the connection zone connecting shoulders 46 to portion 45 an one side of the metal strip, and the connection zone connecting shoulders 46 to the middle portion 41 each end portion comprising sections 43, 44, 45 is bent through an angle of 90° in one direction and the adjacent middle portion 41 of the metal strip is bent through an angle of 90° in the other direction, and the end portion comprising sections 43, 44, 45 is bent about the two bases of trapezoidal portion 44 respectively in two opposite directions so as to bring the rectangular end portion 43 substantially within the same plane as the middle portion 41 of the metal strip (FIG. 7).

Figure 8:
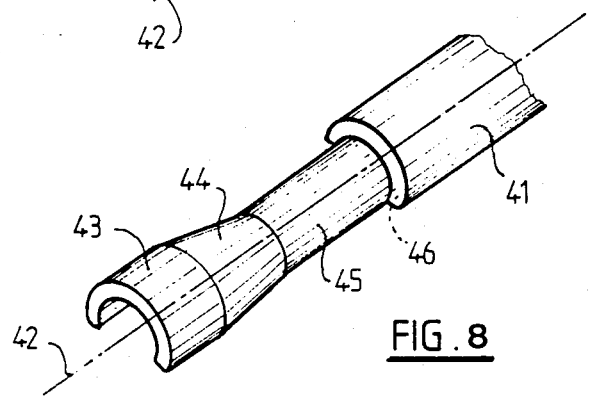
FIG. 8 is a perspective view of the end of the metal strip of FIG. 7, after a die stamping operation has been performed thereon.

In a die of appropriate shape, the metal strip is deformed, the rectangular end portion 43 and the middle portion 41 according to a first radius of curvature and the narrowed rectangular portion 45 in accordance with a second radius of curvature smaller than the first one, the trapezoidal portions 44 being accordingly deformed so as to be integrally joined with the adjacent cylindrical portions (FIG. 8).

Figure 9:
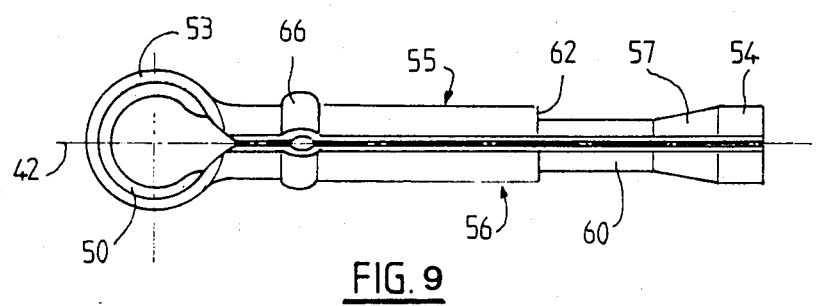
FIG. 9 is a side view of the peg of FIGS. 6 to 8 after assembly thereof.
Figure 10:
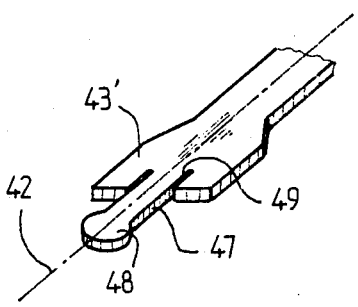
FIG. 10 is a perspective view of one of the ends of the starting metal strip in accordance with a variant of the peg of FIGS. 6 to 9.

The metal strip thus cut out, bent and deformed, in the shape of a wire, is bent back or folded in half upon itself along axis 42 and substantially about the transverse axis so as to form a securing eye 53, at one end of the suspension peg and, at the other end, a cylindrical portion 54 formed by means of the two portions 43 which are in the form of shells, a first truncated cone shaped expansion portion 57, adjacent portion 54 and formed by means of the two portions 44 and, beyond, on the other side thereof with respect to the cylindrical end portion 54, another cylindrical portion 60 formed by means of the two portions 45, of a smaller diameter, and an annular shoulder 62, the portions 43, 44, 45 and 41, interposed between eye 53 and shoulder 62, being joined together in pairs by means of their two respective edges along the same joint plalne (FIG. 9). In another embodiment of the peg of the invention (FIGS. 10, 11, 12) with the same reference numerals being used for designating the same means, starting with a metal strip substantially longer than the preceding one, beyond one of the two rectangular end portions 43 a projecting tongue 47 is formed which extends the rectangular end portion along the axis 42 and which has at the end thereof a closure ddisk 48 intended to be bent back substantially through an angle of 90° so as to be engaged, after bending of the metal strip (of the wire), between the two shells 43', 43" substantially within their end plane, and in abutment against shell 43" disposed opposite shell 43' carrying this closure disk 48, and therefore, the disk 48 serves to oppose closure or flattening of the two shells. In order to accomplish this, two slits 49 are formed within the rectangular portion 43' so as to extend parallel to axis 42 and as extensions of the side waalls or edges of tongue 47, so that disk 48, after bending back of the metal strip, comes into abutment upon the inside surface of and against the other shell 43" (FIG. 11).

Upon the narrowed cylindrical portion 60 is mounted a cylindrical expandable anchorage socket 61 coaxial with axis 42, of an internal diameter slightly greater than the diameter of the narrowed portion 60 and with an external diameter substantially equal to the diameter of the circular section of the two legs 55, 56 joined together side by side. Initially, socket 61 extendds substantially between the truncated cone shaped portion 57 and the annular shoulder 62. It participates in holding the legs in their side by side position. Socket 61 was obtained from a rectangular plate, rolled upon itself, with its two opposite edges joined together. Socket 61 includes immobilizing spurs (not shown).

Legs 55, 56 include a positioning collar 66, in a plane perpendicular to axis 42, formed during shaping of the metal strip.

Figure 11:
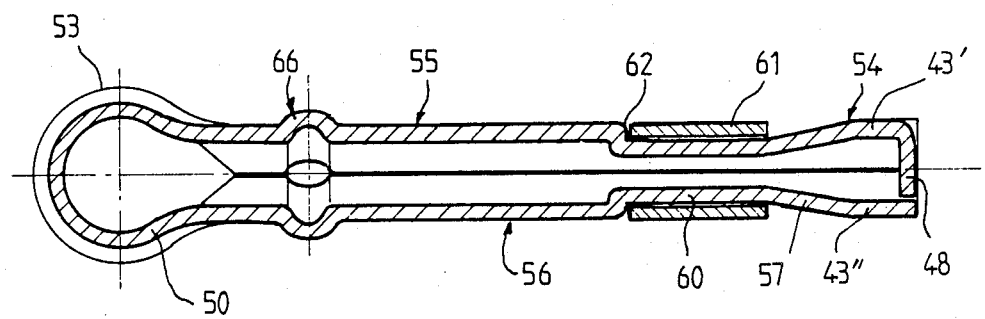
FIG. 11 is a sectional view of the variant of the peg formed from the metal strip of FIG. 10.
Figure 12:
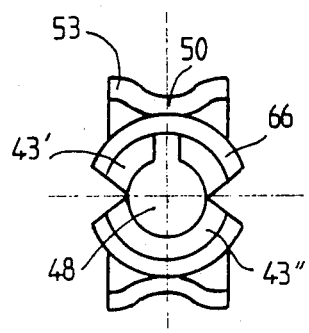
FIG. 12 is an end view of the peg of FIG. 11.

In addition, during shaping of the metal strip, within the central part 41 thereof, which ultimately becomes the eye 53, a rib 50 is formed, by displacement of material, which, as an internal projection, plays a stiffening role after the bending of the metal strip (FIGS. 9, 11 and 12).

The procedure for anchoring this last peg, similar to the previous one, will now be described.

Having previously bored a hole within the receiving material, of a diameter slightly greater than the external diameter of socket 61 but slightly less than the diameter of the positioning collar 66, the peg is inserted into the hole by means of its cylindrical end portion 54, using the same tool, until the positioning collar abuts against the edge of the hole. The positioning collar then determines the depth of penetration of the socket 61. Then, using the tool, thus serving this time as lever, a retractive force is exerted upon the peg, through means of its eye 53, and directed outwardly of the hole. With the socket immobilized with respect to translational movement by means of expansion cone 57, with the end of the peg forming a relatively indeformable body because of the closure disk, penetrates into the socket 61 which will expand radially outwardly until it is anchored within the saidwall of the receiving hole. The peg is then itself anchored within the hole.

It will be noted that, in the absence of the closure disk, the cooperation of the edges of the end shells would prevent these shells from being crushed too readily.

It will also be noted that, for forming the peg, the step illustrated in FIG. 7 could be avoided by passing directly from the stop shown in FIG. 6 to that shown in FIG. 8.

Obviously, many modifications and variations of the present invention are possible in light of the above teachings. It is therefore to be understood that within the scope of the appended claims, the present invention may be practiced otherwise than as specifically described herein.

We claim:

1. A suspension peg to be anchored within a hole defined within a support panel and from which objects may be suspendingly supported, comprising:

a wire bent upon itself so as to form a substantially annular securing eye portion, to which said objects to be suspendingly supported may be secured, at one end of said suspension peg; mating wire ends, to be anchored within said hole defined within said support panel, formed at the opposite end of said suspension peg; and an intermediate portion of said suspension peg defined between said annular securing eye portion formed at said one end of said suspension peg and said mating wire ends formed at said opposite end of said suspension peg; and expansible collar means, having a predetermined inner diametrical extent, disposed about said intermediate portion of said suspension peg for engagement with interior wall prtions of said hole defined within said support panel when said expansible collar means is radially expanded so as to anchor said suspension peg within said hole defined within said support panel, said mating wire ends of said suspension peg wire including expansion means, having an outer diametrical extent which is greater than said inner diametrical extent of said expansible collar means, for operatively engaging said expansible collar means, under the influence of a tractive force exerted upon said securing eye portion in a direction extending outwardly from said hole from said mating wire ends of said wire toward said securing eye portion of said wire, and for radially expanding said expansion collar into said anchoring engagement with said interior wall portions of said hole defined within said support panel.

2. A suspension peg as set forth in claim 1, wherein: sai dmating wire ends of said suspension peg include means for preventing radial deformation of said wire ends with respect to each other when said mating wire ends engage said expansible collar means under the influence of said tractive force.

3. A suspension peg s set forth in claim 2, wherein: said deformation preventing means comprising a closure disk integrally formed with one of said mating wire ends of said suspension peg and defining a closed end portion of said suspension peg at said opposite end of said suspension peg.

4. A suspension peg as set forth in claim 3, wherein: said mating wire ends comprise half sections of a cylindrical tube having a longitudinal axis; and said closure disk is integrally formed with one of said cylindrical tube half sections so as to extend transversely to said longitudinal axis and thereby engage the other one of said cylindrical tube half sections.

5. A suspension peg as set forth in claim 1, wherein: said expansion means of said mating wire ends comprises an expansion cone portion having a larger portion thereof disposed toward said mating wire ends and a smaller portion thereof disposed toward said expansible collar means.

6. A suspension peg as set forth in claim 1, wherein: said expansion means of said mating wire ends comprises an expansion pyramid portion having a larger portion thereof disposed toward said mating wire ends and a smaller portion thereof disposed toward said expansible collar means.

7. A suspension peg as set forth in claim 1, further comprising:
means provided upon said expansible collar means for immobilizing said expansible collar means within said hole defined within said support panel.

8. A suspension peg as set forth in claim 1, wherein: said mating wire ends comprise half sections of a cylindrical rod.

9. A suspension peg as set forth in claim 1, wherein: said mating wire ends comprise half sections of a cylindrical tube.

10. A suspension peg as set forth in claim 1, wherein: said wire comprises a wire having a planar face which is bent upon itself such that said mating wire ends include mating planar face portions.

11. A suspension peg as set forth in claim 10, wherein: said wire comprises a semicylindrical rod.

12. A suspension peg as set forth in claim 1, wherein: said wire is fabricated from stamped metal strip.

13. A suspension peg as set forth in claim 1, further comprising:
rib means integrally formed with said securing eye portion of said suspension peg for stiffening said securing eye portion of said suspension peg.

14. A suspension peg as set forth in claim 1, further comprising:
expansion slit means, extending axially along said expansible collar means, defined within a sidewall portion of said expansible collar means.

15. A suspension peg as set forth in claim 1, further comprising:
positioning means defined upon exterior wall portions of said bent wire within the vicinity of said annular securing eye portion of said suspension peg for determining the depth of penetration of said suspension peg within said hole defined within said support panel.

16. A suspension peg as set forth in claim 15, wherein: said positioning means comprises a pair of diametrically opposed studs projecting radially outwardly from said exterior wall portions of said bent wire.

17. A suspension peg as set forth in claim 15, wherein: said positioning means comprises an annular collar integrally formed with said exterior wall portions of said bent wire.

18. A suspension peg to be anchored within a hole defined within a support panel and from which objects may be suspendingly supported, comprising:
a wire bent upon itself so as to form a substantially annular securing eye portion, to which said objecs to be suspendingly supported may be secured, at one end of said suspension peg; and mating wire ends, to be anchored within said hole defined within said support panel by anchored engagement with interior wall portions of said hole defined within said support panel when said mating wire ends are radially expanded into engagement with said interior wall portions of said hole defined within said support panel, formed at the opposite end of said suspension peg;
wedge-shaped recess means, having a vertex portion disposed toward said opposite end of said suspension peg and a base portion disposed toward said one end of said suspension peg, defined within said mating wire ends of said suspension peg; and
wedge-shaped expansion means, correspondingly disposed within said wedge-shaped recess means of said mating wire ends, for causing radial expansion of said mating wire ends of said suspension peg into said anchorage engagement with said interior wall portions of said hole defined with said support panel as said mating wire ends of said suspension peg, and said wedge-shaped recess means thereof, are moved relative to said wedge-shaped expansion means under the influence of a tractive force exerted upon said securing eye portion in a direction extending outwardly from said hole defined within said support panel from said mating wire ends of said wire toward said securing eye portion of said wire.

19. A suspension peg s set forth in claim 18, further comprising:
means provided upon said wedge-shaped expansion means, and projecting outwardly through said wedge-shaped recess means of said mataing wire ends, for immobilizing said wedge-shaped expansion means within said hole defined within said support panel.

20. A suspension peg as set forth in claim 18, further comprising:
means provided upon ssaid wedge-shaped expansion means, and projecting outwardly through said wedge-shaped recess means of said mating wire ends, for preventing relative rotation between said wedge-shaped expansion means and said mating wire ends.

* * * * *